( 12 ) United States Patent
Menzel et al.

(10) Patent No.: US 12,233,524 B2
(45) Date of Patent: Feb. 25, 2025

(54) HANDHELD WORK APPARATUS (71) Applicant: Andreas Stihl AG & Co. KG, Waiblingen (DE)

(72) Inventors: Johannes Menzel, Wernau (DE); Lars Robert Kraft, Ludwigsburg (DE); Matthias Maier, Waiblingen (DE); Denis Ehrler, Wernau (DE); Felix Moessinger, Stuttgart (DE); Marc Schmid, Oppenweiler (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 18/307,589

(22) Filed: Apr. 26, 2023

(65) Prior Publication Data

US 2024/0075607 A1 Mar. 7, 2024

(30) Foreign Application Priority Data

May 4, 2022 (EP) ..................................... 22171668

(51) Int. Cl.
*B25F 5/00* (2006.01)
*A01D 34/90* (2006.01)

(52) U.S. Cl.
CPC ............ *B25F 5/006* (2013.01); *A01D 34/905* (2013.01)

(58) Field of Classification Search
CPC ....... B25F 5/006; A01D 34/905; B25D 17/24; B23Q 11/0032; B25G 1/01; H02K 5/24
USPC ........................................... 273/162.1, 162.2
See application file for complete search history.

(56) References Cited

U.S. PATENT DOCUMENTS

| 3,581,832 A | * | 6/1971 | Heermann | ........... A01D 34/905 30/388 |
| 3,651,839 A | * | 3/1972 | Stihl | ..................... F16F 3/0876 173/162.1 |
| 2006/0225288 A1 | | 10/2006 | Herzog et al. | |
| 2006/0266324 A1 | | 11/2006 | Cobb, Jr. | |
| 2018/0250804 A1 | | 9/2018 | Hoche et al. | |

(Continued)

FOREIGN PATENT DOCUMENTS

CN 104339421 * 2/2015 ............. B25F 5/006
DE 10 2005 016 628 A1 10/2006

(Continued)

*Primary Examiner* — Stephen F. Gerrity
*Assistant Examiner* — Linda J Hodge
(74) *Attorney, Agent, or Firm* — Walter Ottesen, P.A.

(57) ABSTRACT

A handheld work apparatus includes a motor, a transmission shaft, a tool, a guide tube, a housing, and a first anti-vibration element. The motor via the transmission shaft drives the tool. The transmission shaft is received in the guide tube. The motor is disposed in the housing. The tool is disposed on a front longitudinal end of the guide tube. The housing is disposed on the rear longitudinal end of the guide tube. The housing at least partially encompasses the guide tube, wherein the guide tube projects from the housing. The first anti-vibration element is disposed such that it acts in a vibration-decoupling manner between the housing and the guide tube. The first anti-vibration element is disposed on that side of the motor facing the tool. The handheld work apparatus includes a second anti-vibration element connecting the motor to the housing in an at least indirectly vibration-decoupled manner.

17 Claims, 4 Drawing Sheets

(56) References Cited

U.S. PATENT DOCUMENTS

2018/0319001 A1* 11/2018 Zhong ..................... B25F 5/006
2019/0240827 A1    8/2019 Menzel et al.
2022/0241952 A1*  8/2022 Rudenstam ............... B25F 5/02

FOREIGN PATENT DOCUMENTS

| DE | 10 2018 000 975 A1 | | 8/2019 | |
|----|---|---|---|---|
| EP | 1 733 613 A1 | | 12/2006 | |
| FR | 2881975 A1 | * | 8/2006 | ............. A01G 20/47 |
| SE | 543 413 C2 | | 11/2020 | |
| WO | WO-2015107731 A1 | * | 7/2015 | ........... A01D 34/905 |
| WO | WO-2016127930 A1 | * | 8/2016 | ................ B25F 3/00 |
| WO | 2019/074424 A1 | | 4/2019 | |

* cited by examiner

HANDHELD WORK APPARATUS

CROSS-REFERENCE TO RELATED APPLICATIONS

This application claims priority of European patent application no. 22171668.1, filed May 4, 2022, the entire content of which is incorporated herein by reference.

TECHNICAL FIELD

The disclosure relates to a handheld work apparatus.

BACKGROUND

A handheld brushcutter which has a housing for a motor, a handle being integrally molded on the housing, is known from US 2006/0225288. The housing bears on the guide tube at two fastening points. Rubber bushings can be provided at the fastening points. In order for the housing clamshells of the housing to be reinforced, the motor is fixedly connected to the housing. The housing can wear out in particular after frequent use of the work apparatus.

SUMMARY

It is an object of the disclosure to refine a handheld work apparatus in such a manner that the work apparatus is highly durable.

This object is, for example, achieved by a handheld work apparatus having a motor; a transmission shaft; a tool; a guide tube having a front longitudinal end and a rear longitudinal end; a housing; a first anti-vibration element; the motor being configured to drive the tool via the transmission shaft; the transmission shaft being received in the guide tube; the motor being disposed in the housing; the tool being disposed on the front longitudinal end of the guide tube; the housing being disposed on the rear longitudinal end of the guide tube; the housing at least partially encompassing the guide tube; the guide tube projecting from the housing; the guide tube at an entry point extending into the housing in a longitudinal direction; the first anti-vibration element being disposed such that the first anti-vibration element acts in a vibration-decoupling manner between the housing and the guide tube; the first anti-vibration element being disposed on a side of the motor facing the tool; and, a second anti-vibration element connecting the motor to the housing in an at least indirectly vibration-decoupled manner.

The disclosure is based on the concept that the housing in the prior art wears out as a result of the vibrations of the motor. The disclosure provides a second anti-vibration element which connects the motor to the housing in an at least indirectly vibration-decoupled manner. As a result, the housing is protected against the wear-inducing transmission of vibrations from the motor to the housing. Consequently, the handheld work apparatus is highly durable. In particular, the motor is connected to the housing exclusively by way of anti-vibration elements. It is ensured as a result that vibrations from the motor can be transmitted to the housing only in a damped manner, or not at all. If only one anti-vibration element were to be provided, the latter would have to have a high hardness in order to be able to guarantee the relative position of the guide tube and the housing within the required tolerance. In the case of an excessively low hardness of a single anti-vibration element, the housing would severely bend in relation to the guide tube and potentially be damaged. In the case of an excessive hardness of a single anti-vibration element, the damping effect is only very minor, and vibrations which by way of the guide tube and the damping element are transmitted from the motor to the housing could contribute towards wear in the housing. As a result of the second anti-vibration element between the motor and the housing, the housing is well protected. The two anti-vibration elements can be of a soft configuration and have a high damping effect on the vibrations. As a result of the minor transmission of vibrations to the housing, hardly any vibrations are transmitted to the user when the user touches the housing. In particular, a handle for carrying and/or guiding the work apparatus can be disposed on the housing. The handle can be fixedly connected to the housing.

Owing to the housing being well decoupled in terms of vibration, a quiet operation of the work apparatus is possible. The housing is barely, or not at all, excited for acoustic emission. The housing barely, or not at all, contributes towards the disturbance by noise of the work apparatus. The housing can be very light because the latter does not have to have a large mass in order to avoid acoustic emissions. This enables a saving in terms of weight. Likewise, the use of lighter and/or more inexpensive materials is possible.

In an embodiment of the disclosure, the second anti-vibration element is disposed at an element spacing, measured in the longitudinal direction, from the first anti-vibration element. As a result of a spacing between the two anti-vibration elements, the latter can be of a softer configuration and nevertheless sufficiently support the housing. As a result of the two anti-vibration elements being able to be of a softer configuration, the latter can better dampen vibrations. This increases the durability of the work apparatus. The housing has a housing length, measured in the longitudinal direction. The longitudinal direction is the direction in which the guide tube extends into the housing at the entry point. In particular, the longitudinal direction corresponds to the direction of a tangent on the guide tube at the entry point. In particular, the longitudinal direction corresponds to the direction in which a drive axle of the motor extends. The housing has a housing length, measured in the longitudinal direction. The element spacing advantageously is at least 30%, in particular at least 40%, of the housing length. As a result, the first anti-vibration element and the second anti-vibration element can be disposed such that the housing is well supported in relation to the guide tube, and a high damping effect of the anti-vibration elements is simultaneously possible because the two anti-vibration elements can be of a soft configuration.

The second anti-vibration element preferably connects the guide tube to the housing in an at least indirectly vibration-decoupled manner. As a result of the guide tube and the housing being decoupled in terms of vibration, the housing is protected against wear as a result of contact with the guide tube, in particular against vibrations which are transmitted from the guide tube to the housing.

The second anti-vibration element is expediently disposed on that side of the motor that faces away from the tool. As a result, the motor by way of the second anti-vibration element is in particular reliably supported in relation to the housing. In this way, a static moment which in terms of a center of rotation is present about the first anti-vibration element can be reliably absorbed. In particular, the effect of the weight force on the housing can be absorbed such that the housing does not bear on the motor and/or the guide tube. As a result, it can be prevented that the motor and/or the guide tube bear on the housing. This can prevent the transmission of vibrations from the motor to the housing. This increases the durability of the housing. The motor has a large vibrating mass. As a result of the disposal of the first anti-vibration element on that side of the motor that faces the tool, and of the second anti-vibration element on that side of the motor that faces away from the tool, the vibrations of the motor can be effectively damped by the two anti-vibration elements. If only the first anti-vibration element were to be provided, the center of gravity of the motor could vibrate about a center of rotation of the first anti-vibration element by way of a large lever arm and impact the housing in the process. This is reliably prevented by the disposal of the second anti-vibration element on that side of the motor that faces away from the tool. The disposal of the second anti-vibration element on that side of the motor that faces away from the tool prevents the described scenario more reliably than the disposal of the second anti-vibration element on that side of the motor that faces the tool.

In an embodiment of the disclosure, a battery for supplying the motor with energy is disposed in the housing. It can be provided that the battery is connected to the housing in such a manner that the battery, conjointly with the housing, via the second anti-vibration element is vibration-decoupled from the motor. As a result, the battery is protected against vibrations of the motor. As a result of the disposal of the battery on the housing, the inert mass of the housing is increased. As a result, the absorption of specific vibration frequencies by the housing can be prevented. As a result, the emission of high-frequency noise by the housing can also be avoided. In particular, the housing has a battery compartment for receiving the battery. The battery compartment expediently has a structure in the form of corrugations and/or thickenings. The noise emission of the housing can be positively influenced by a suitable configuration of the structure of the battery compartment. The housing contributes only to a minor extent, or not at all, towards the noise generation by the work apparatus.

The first anti-vibration element in relation to the battery has a battery spacing, measured in the longitudinal direction. The second anti-vibration element in relation to the first anti-vibration element has the element spacing, measured in the longitudinal direction. The element spacing preferably is at least 50% of the battery spacing. Batteries typically have a large mass. The center of gravity of the mass of the unit of the housing and the battery is very substantially influenced by the position of the battery in the housing. As a result of the element spacing being at least 50% of the battery spacing, it is ensured that the housing is supported relatively close to the battery and close to the center of gravity of the latter. As a result, large relative movements between the housing and the motor can be prevented. This protects the housing, and in particular the battery, against contact with the motor, in particular against the transmission of the vibrations of the motor, and ensures a high durability of the handheld work apparatus.

The battery spacing preferably is at least 100 mm, in particular at least 500 mm. In work apparatuses having a large battery spacing, the wear on the housing and/or the battery can be particularly high. In this instance, the second anti-vibration element according to the disclosure is particularly advantageous.

The battery spacing is in particular at most 800 mm. It is ensured as a result that the lever of the housing and of the battery that engages on the first anti-vibration element is not excessively large.

The battery spacing can preferably be larger than the element spacing. In particular, the second anti-vibration element in terms of the longitudinal direction is disposed between the motor and the battery.

The battery can preferably be disposed on that side of the motor that faces away from the tool. In this case, the configuration according to the disclosure of the handheld work apparatus is particularly advantageous because the unit of the housing and the battery has a center of gravity which in terms of the longitudinal direction lies particularly far away from the first anti-vibration element such that large vibration amplitudes of the housing, conjointly with the battery, are fundamentally conceivable. As a result, a high degree of wear on the housing or else the battery is also fundamentally possible. The second anti-vibration element prevents such wear.

The guide tube is advantageously at least indirectly rigidly connected to the motor. The motor is securely held as a result. In particular, the positioning of a gearbox between the motor and the transmission shaft is reliably established.

The guide tube and the motor can preferably be connected by way of a connection which is free of any anti-vibration element.

In an embodiment of the disclosure it is provided that the motor on that side thereof that faces away from the tool at least at one bearing position and a second bearing position is connected in a vibration-decoupled manner to the housing. In particular, the first bearing position is disposed at a first radial spacing from an output shaft of the motor. In particular, the second bearing position is disposed at a second radial spacing from the output shaft of the motor. The first radial spacing and the second radial spacing can in each case preferably be at least the size of a radius of the guide tube. The radius of the guide tube is in particular measured radially in relation to the output shaft of the motor at the entry point of the guide tube into the housing. As a result of the radial spacings of the two bearing positions being at least the size of the radius of the guide tube, the moment, in particular the moment of force, of the motor is efficiently absorbed at the bearing positions. In particular, the first bearing position and the second bearing position are mutually disposed at an angular spacing in terms of the output shaft of the motor. This also contributes towards a positive absorption of the moment, in particular of the moment of force of the motor. In particular, the angular spacing is at least 90°, in particular at least 150°, in particular at least 170°. The angular spacing is in particular at most 190°.

The motor at the bearing positions can preferably be connected in a vibration-decoupled manner to the housing by way of an anti-vibration element. Advantageously, the motor at the first bearing position and on the second bearing position is mounted on the housing by way of the second anti-vibration element. It can be provided that the motor is mounted on the housing at a plurality of bearing positions via the same integral anti-vibration element.

The handheld work apparatus can advantageously have a third anti-vibration element. In particular, the third anti-vibration element connects the motor to the housing in an at least indirectly vibration-decoupled manner. The third anti-vibration element is preferably disposed on that side of the motor that faces away from the tool. In particular, the handheld work apparatus has a fourth anti-vibration element. The fourth anti-vibration element is expediently disposed such that the latter acts in a vibration-decoupling manner between the housing and the guide tube. The fourth anti-vibration element can preferably be disposed on that side of the motor that faces the tool. In particular, the first anti-vibration element and the fourth anti-vibration element lie in a first plane. The first plane extends in the longitudinal direction. The second anti-vibration element and the third anti-vibration element expediently lie in a second plane. The second plane extends in the longitudinal direction. The first plane and the second plane advantageously enclose an angle of 70° to 110°, in particular of 80° to 100°. This results in a particularly stable support of the housing in relation to the guide tube and the motor. The first anti-vibration element and the fourth anti-vibration element form a first pair. The second anti-vibration element and the third anti-vibration element form a second pair. The first pair and the second pair are mutually disposed in a cruciform manner, so to speak. As a result, vibrations in the radial directions of the output shaft of the motor are damped, the vibrations running substantially transversely, in particular perpendicularly, to one another. This results in a positive damping of the vibrations of the motor in relation to the housing.

In particular, the first anti-vibration element is disposed at a third radial spacing from the transmission shaft, in particular from the output shaft of the motor. The fourth anti-vibration element expediently is disposed at a fourth radial spacing from the transmission shaft, in particular from the output shaft of the motor. The third radial spacing can preferably be at least the size of the radius of the guide tube. The fourth radial spacing is advantageously at least the size of the radius of the guide tube.

In an embodiment of the disclosure it is provided that the handheld work apparatus is configured such that a transmission of vibrations from the transmission shaft to the housing is possible only so as to be damped by way of anti-vibration elements. This also protects the housing against wear by the transmission shaft.

One of the anti-vibration elements is expediently connected directly to the housing and directly to the guide tube. In particular, the first anti-vibration element is connected directly to the housing and directly to the guide tube.

One of the anti-vibration elements, in particular the first anti-vibration element, advantageously seals a gap between the guide tube and the housing. Efficient guiding of the air for cooling the motor is possible as a result.

The handheld work apparatus advantageously includes a handle. The handle is connected to the housing. In particular, the handle conjointly with the housing is vibration-decoupled in relation to the guide tube as well as in relation to the motor. This enables the user of the handheld work apparatus a comfortable use of the handheld work apparatus. The user is protected against the undamped transmission of vibrations of the motor to the handle and to the user per se. As a result of the handle conjointly with the housing being vibration-decoupled from the guide tube, the user is protected against the undamped transmission of vibrations from the guide tube, in particular against the undamped transmission of vibrations of the tool by way of the guide tube to the handle and to the user per se.

Expediently, the motor is connected to the housing exclusively by intervening anti-vibration elements such that vibrations are able to be transmitted from the motor to the housing only so as to be damped by way of anti-vibration elements. It is ensured as a result that the housing does not suffer any damage as a result of vibrations of the motor.

BRIEF DESCRIPTION OF DRAWINGS

The invention will now be described with reference to the drawings wherein.

DETAILED DESCRIPTION

Figure 1:
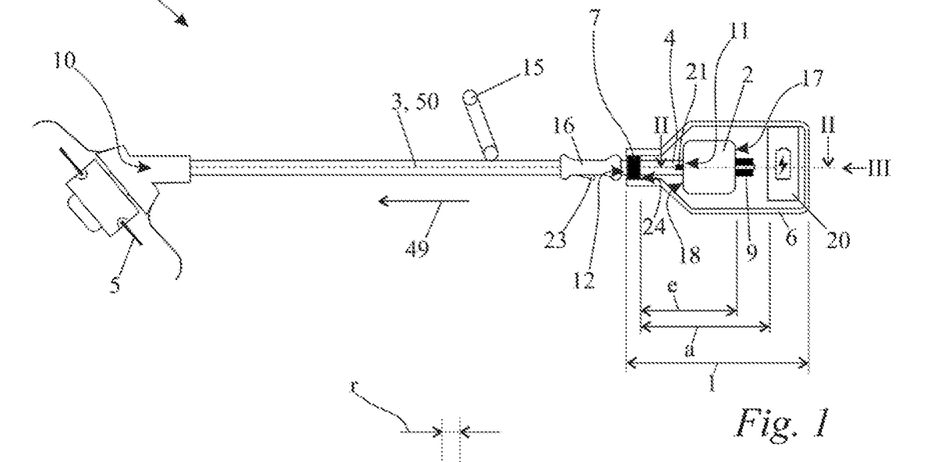
FIG. 1 shows a schematic sectional illustration of a first embodiment of a handheld work apparatus, having a first anti-vibration element and a second anti-vibration element.

FIG. 1 shows a handheld work apparatus 1 having a guide tube 4. The handheld work apparatus 1 in the embodiment is a brushcutter. However, the handheld work apparatus may also be any other work apparatus having a guide tube. The handheld work apparatus may also be a pole-mounted pruner, a hedge cutter, or the like.

The handheld work apparatus 1 includes a motor 2 and a tool 5. The motor 2 in the embodiment is an electric motor. However, the motor may also be an internal combustion engine. The tool 5 in the embodiment is a cutting line of a mower head. However, the tool 5 may also be a saw chain, a saw blade, or similar. The motor 2 drives the tool 5. The motor 2 is disposed in a housing 6.

The guide tube 4 has a front longitudinal end 10 and a rear longitudinal end 11. The tool 5 is disposed on the front longitudinal end 10 of the guide tube 4. The housing 6 is disposed on the rear longitudinal end 11 of the guide tube 4.

A transmission shaft 3 is received in the guide tube 4. The transmission shaft 3 connects the motor 2 to the tool 5. The motor 2 drives the tool 5 by way of the transmission shaft 3.

The guide tube 4 projects from the housing 6. The housing 6 is held on the guide tube 4. The housing 6 at least partially encompasses the guide tube 4. The guide tube 4 protrudes into the housing 6.

The handheld work apparatus 1 includes a first anti-vibration element 7. The first anti-vibration element 7 is disposed such that it acts in a vibration-decoupling manner between the housing 6 and the guide tube 4. The first anti-vibration element 7 for decoupling vibrations is disposed between the housing 6 and the guide tube 4.

The housing 6 has an entry point 12. The guide tube 4 enters the housing 6 at the entry point 12. The entry point 12 is an opening in the housing 6. This opening completely penetrates a wall of the housing. From an external side of the housing 6, the guide tube 4 penetrates into the interior of the housing 6 by way of the entry point 12. The entry point 12 in terms of the longitudinal direction 49 faces the tool 5. The guide tube 4 at the entry point 12 extends in a longitudinal direction 49. If the profile of the guide tube is curved at the entry point 12, the longitudinal direction 49 runs in the direction of a tangent on the guide tube at the entry point 12. In this case, the longitudinal direction 49 runs in the direction of the tangent on the transmission shaft 3 at the entry point 12. The motor 2 has a drive shaft 21 having a rotational axis 50. In the embodiment, the longitudinal direction 49 runs in the direction of the rotational axis 50.

In an alternative description of the disclosure it can be provided that the longitudinal direction 49 runs along the profile of the transmission shaft 3. In this instance, the longitudinal direction 49 follows the profile of the transmission shaft 3. The length measured in the direction of the longitudinal direction 49 in this instance corresponds to a path integral along the potentially also curved longitudinal direction 49. All length indications and conditions set forth here also apply to lengths which are measured along a longitudinal direction thus defined.

In the embodiment, the first anti-vibration element 7 is disposed in the housing 6. In particular, the first anti-vibration element 7 is disposed at the entry point 12 of the housing 6. However, it can also be provided that the anti-vibration element 7 is disposed at another location. The first anti-vibration element 7 connects the guide tube 4 to the housing 6 so as to be at least indirectly decoupled in terms of vibration. In the embodiment according to FIG. 1, the first anti-vibration element 7 connects the guide tube 4 and the housing 6 to one another so as to be directly decoupled in terms of vibration. However, it can also be provided that at least one component which is fixedly connected to the guide tube 4 is disposed between the first anti-vibration element 7 and the guide tube 4 such that the at least one component vibrates conjointly with the guide tube 4. In this case, the first anti-vibration element 7 by way of the at least one component is connected indirectly to the guide tube 4. It can also be provided that at least one construction element which is fixedly connected to the housing 6 is disposed between the housing 6 and the first anti-vibration element 7 such that the at least one construction element vibrates conjointly with the guide tube 4. In this case, the first anti-vibration element 7 by way of the at least one construction element is connected indirectly to the guide tube 4.

The motor 2 has a side 18 that faces the tool 5. The side 18 that faces the tool 5 faces the tool 5 in terms of the longitudinal direction 49. The first anti-vibration element 7 is disposed on that side 18 of the motor 2 that faces the tool 5.

The first anti-vibration element 7 in the first embodiment acts transversely, in particular perpendicularly, to the longitudinal direction 49. The first anti-vibration element 7 can in particular dampen vibrations having a vibration amplitude in the direction transverse, in particular perpendicular, to the longitudinal direction 49. The first anti-vibration element 7 in the embodiments is an elastomer. However, it can also be provided that the first anti-vibration element is a spring, in particular a spiral spring. Other types of damping elements are also possible.

The work apparatus 1 includes a second anti-vibration element 9. The second anti-vibration element 9 connects the motor 2 to the housing 6 in an at least indirectly vibration-decoupled manner. In the embodiment according to FIG. 1, the second anti-vibration element 9 connects the motor 2 to the housing 6 so as to be directly decoupled in terms of vibration. The second anti-vibration element 9 for decoupling vibrations is disposed between the motor 2 and the housing 6.

The second anti-vibration element 9 in the first embodiment acts transversely, in particular perpendicularly, to the longitudinal direction 49. The second anti-vibration element 9 can in particular dampen vibrations having a vibration amplitude in the direction transverse, in particular perpendicular, to the longitudinal direction 49. The second anti-vibration element 9 in the embodiments is an elastomer. However, it can also be provided that the second anti-vibration element is a spring, in particular a spiral spring. Other types of damping elements are also possible.

The second anti-vibration element 9 from the first anti-vibration element 7 has an element spacing e, measured in the longitudinal direction 49. The housing 6 has a housing length l, measured in the longitudinal direction 49. The element spacing e is at least 30% of the housing length l. The element spacing e in the embodiments is at least 40% of the housing length l. The element spacing e in the embodiments is at most 100%, in particular at most 95%, of the housing length l. It can also be provided that the element spacing e is at most 70% of the housing length l.

The guide tube 4 is at least indirectly rigidly connected to the motor 2. The guide tube 4 and the motor 2 are connected to one another by way of a connection which is free of any anti-vibration element. It can also be provided that a gearbox is disposed between the motor 2 and the guide tube 4. In this instance, the motor is indirectly supported by the guide tube 4 by way of the gearbox.

The connection between the motor 2 and the guide tube 4 includes in particular a flange, not illustrated. The flange is fastened to the guide tube or to the gearbox. The flange is co-rotationally connected to the guide tube 4. In the embodiment, the motor 2 includes a stator and a rotor. The stator is co-rotationally fastened to the flange. The rotor is rotatably mounted on the flange. The motor 2 by way of the flange is rigidly connected to the guide tube 4.

Vibrations of the motor 2 can be transmitted without impediment to the guide tube 4. Vibrations of the guide tube 4 can be transmitted without impediment to the motor 2. The motor 2 and the guide tube 4 are coupled in terms of vibration. As a result of the rigid connection between the motor 2 and the guide tube 4 it is possible for both to be conjointly supported in relation to the housing. In principle, two anti-vibration elements suffice for supporting the unit of the motor 2 and the guide tube 4.

The second anti-vibration element 9 connects the guide tube 4 to the housing 6 in an at least indirectly vibration-decoupled manner. The second anti-vibration element 9 by way of the motor 2 connects the guide tube 4 to the housing 6 so as to be indirectly decoupled in terms of vibration. It can also be provided that the second anti-vibration element connects the guide tube to the housing 6 so as to be directly decoupled in terms of vibration. The motor 2 has a side 17 that faces away from the tool 5. That side 17 of the motor 2 that faces away from the tool 5 faces away from the tool 5 in terms of the longitudinal direction 49. In the embodiments, the second anti-vibration element 9 is disposed on that side of the motor 2 that faces away from the tool 5. However, it can also be provided that the second anti-vibration element is disposed at another location. In the embodiments, the motor 2 in terms of the longitudinal direction 49 is disposed between the first anti-vibration element 7 and the second anti-vibration element 9.

The motor 2 is connected to the housing 6 exclusively by way of intervening anti-vibration elements 7, 9 such that vibrations are able to be transmitted from the motor 2 to the housing 6 only so as to be damped by way of anti-vibration elements 7, 9.

The handheld work apparatus 1 is configured such that the transmission of vibrations from the transmission shaft 3 to the housing 6 is possible only so as to be damped by way of anti-vibration elements 7, 9. The housing 6 is supported by way of the first anti-vibration element 7 as well as by way of the second anti-vibration element 9. The housing 6 by way of the first anti-vibration element 7 and the second anti-vibration element 9 is at least indirectly held on the guide tube 4.

The work apparatus 1 includes a battery 20. The battery 20 serves for supplying the motor 2 with energy. The battery 20 is disposed in the housing 6. The battery 20 is connected to the housing 6 in such a manner that the battery 20 conjointly with the housing 6 forms a common vibrating mass. The battery 20 is connected to the housing 6 in such a manner that the battery 20, conjointly with the housing 6, via the second anti-vibration element 9 is vibration-decoupled from the motor 2. The battery 20 is fastened to the housing 6. It can be provided that the battery 20 is rigidly connected to the housing 6. In the embodiment, the battery 20 is held in the housing 6, in particular in a battery compartment, not illustrated, of the housing 6, by way of ejecting and clamping springs, not illustrated.

The first anti-vibration element 7 from the battery 20 has a battery spacing a, measured in the longitudinal direction 49. The element spacing e, measured in the longitudinal direction 49, between the first anti-vibration element 7 and the second anti-vibration element 9 is at least 50% of the battery spacing a. In the embodiments, the element spacing e is at least 60% of the battery spacing a. In the embodiment according to FIG. 1, the battery spacing a is at least 100 mm. In the embodiments according to FIGS. 4 and 6, the battery spacing a is at least 500 mm. The battery spacing a is at most 800 mm. The battery spacing a is larger than the element spacing e. The battery 20 is disposed on that side 17 of the motor 2 that faces away from the tool 5. In the embodiments, the second anti-vibration element 9 in terms of the longitudinal direction 49 is disposed between the motor 2 and the battery 5.

As is illustrated in FIG. 1, the handheld work apparatus 1 in the embodiment according to FIG. 1 has a handle 16. The handle 16 is fastened to the guide tube 4. The handle 16 in terms of vibration is coupled to the guide tube 4. An actuating element 23 is disposed on the handle 16. The actuating element 23 serves for activating the motor 2. The handheld work apparatus 1 can be held via the handle 16. Additionally, the handheld work apparatus 1 has a guide handle 15. The guide handle 15 serves for guiding the handheld work apparatus 1. In the embodiment according to FIG. 1, the guide handle 15 is formed by a tubular handle. The tubular handle of the guide handle 15 is fastened to the guide tube 4. The tubular handle of the guide handle 15 is shaped like a loop.

Figure 2:
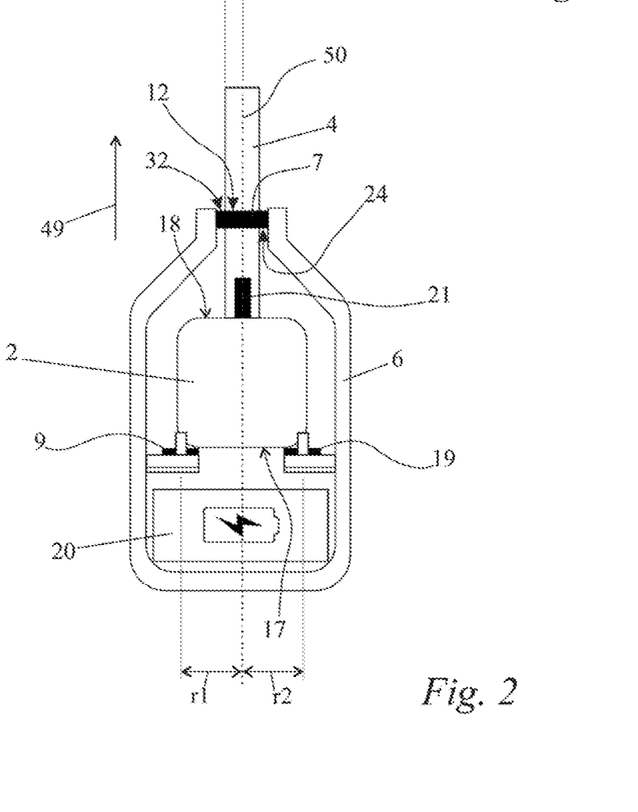
FIG. 2 shows a schematic sectional illustration along the section line II-II from FIG. 2.

As is illustrated in FIG. 2, the handheld work apparatus 1 includes a third anti-vibration element 19. All of the above statements pertaining to the second anti-vibration element 9 apply in an analogous manner to the third anti-vibration element 19. In particular, the third anti-vibration element 19 connects the motor 2 to the housing 6 in an at least indirectly vibration-decoupled manner. The third anti-vibration element 19 is disposed such that the latter acts in a vibration-decoupling manner between the housing 6 and the guide tube 4. The third anti-vibration element 19 is disposed on that side 17 of the motor 2 that faces away from the tool 5. The second anti-vibration element 9 and the third anti-vibration element 19 are mutually spaced apart in the direction transverse to the longitudinal direction 49, in the embodiments in the direction perpendicular to the longitudinal direction 49.

The handheld work apparatus 1 has a first bearing position 13 and a second bearing position 14. The first bearing position 13 and the second bearing position 14 serve for at least indirectly mounting the motor 2. It can be provided that further components of the work apparatus 1 are disposed between the bearing positions 13 and 14 and the motor 2. In the embodiment, the motor 2 is additionally mounted by the first anti-vibration element 7. The first bearing position 13 and the second bearing position 14 are disposed on that side 17 of the motor 2 that faces away from the tool 5. The first anti-vibration element 7 is disposed on that side 18 of the motor 2 that faces the tool 5. The first anti-vibration element 7 mounts the housing 6 at a third bearing position 32 on the guide tube 4. In this way, the motor 2 is at least indirectly mounted at the third bearing position 32. It can also be provided that the unit of the motor 2 and the guide tube 4 is mounted only at a single bearing position on that side 18 of the motor 2 that faces the tool 5, and simultaneously only at a single bearing position on that side 17 that faces away from the tool 5.

In the embodiment, the motor 2 on that side 17 thereof that faces away from the tool 5 is connected at least at the first bearing position 13 and the second bearing position 14 in a vibration-decoupled manner to the housing 6. As illustrated in FIG. 2, the first bearing position 13 has a first radial spacing r1 from the rotational axis 50 of the drive shaft 21. The second bearing position 14 has a second radial spacing r2 from the rotational axis 50 of the drive shaft 21 of the motor 2. The guide tube 4 has a radius r. The radius r is measured in particular at the entry point 12. The radius r of the guide tube is measured in relation to the rotational axis 50 of the drive shaft 21. The first radial spacing r1 and the second radial spacing r2 are each at least the size of the radius r of the guide tube 4.

Figure 3:
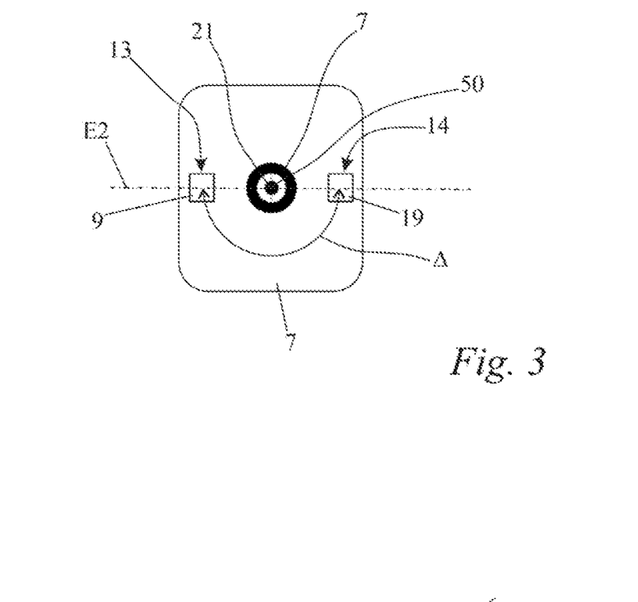
FIG. 3 shows a schematic illustration of the anti-vibration elements from FIG. 1, with the view directed in the direction of the arrow III from FIG. 1.

As illustrated in FIG. 3, the first bearing position 13 and the second bearing position 14 are disposed at an angular spacing a from each other. The angular spacing a is measured in relation to the rotational axis 50 of the output shaft 21 of the motor 2. The angular spacing a is at least 90°, in particular at least 150°. In the embodiment, the angular spacing a is at least 170°. The angular spacing a is at most 270°, in particular at most 210°. In the embodiment, the angular spacing a is 190°.

In the embodiment according to FIG. 3, the motor 2 at the first bearing position 13 is connected in a vibration-decoupled manner to the housing 6 by way of the second anti-vibration element 9. The motor 2 at the second bearing position 14 is connected in a vibration-decoupled manner to the housing 6 by way of the third anti-vibration element 19. It can also be provided that the motor at the first bearing position as well as at the second bearing position is mounted on the housing by way of the second anti-vibration element. It can be provided that the motor is mounted on the housing at a plurality of bearing positions via the same integral anti-vibration element.

As is illustrated in FIGS. 1 and 2, a gap 24 is situated between the guide tube 4 and the housing 6. The gap 24 encircles the guide tube 4. The gap 24 is disposed on the entry point 12. In the embodiment according to FIGS. 1 and 2, the first anti-vibration element 7 seals the gap 24. Positive cooling of the motor 2 is possible as a result.

Figure 4:
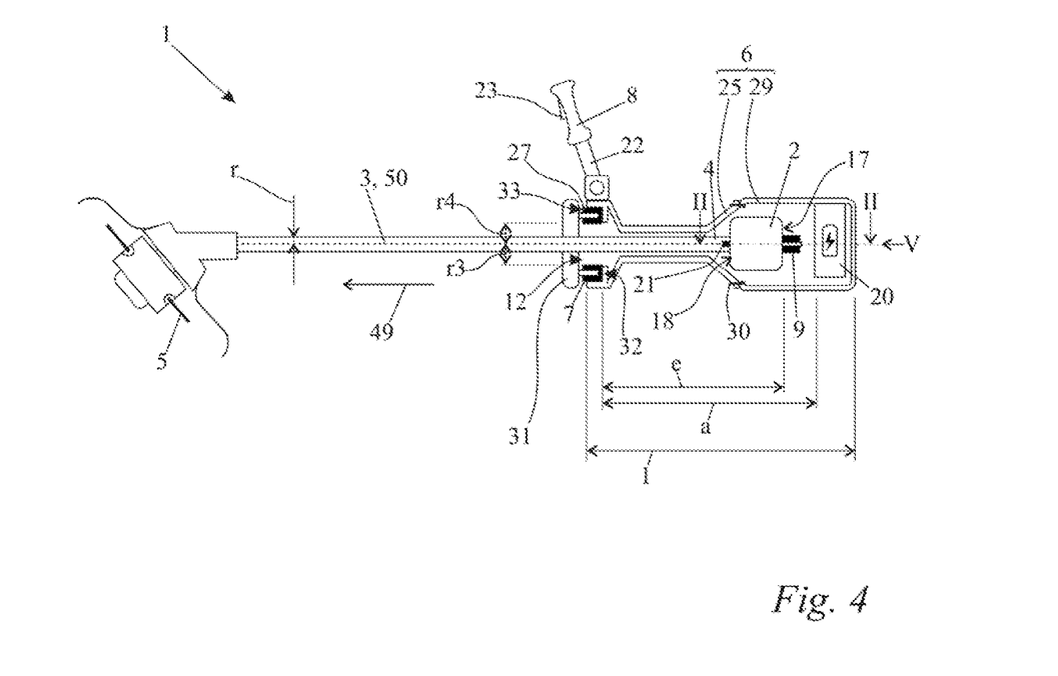
FIG. 4 shows a schematic sectional illustration of a second embodiment of a handheld work apparatus, having a first anti-vibration element and a second anti-vibration element.
Figures 5, 6:
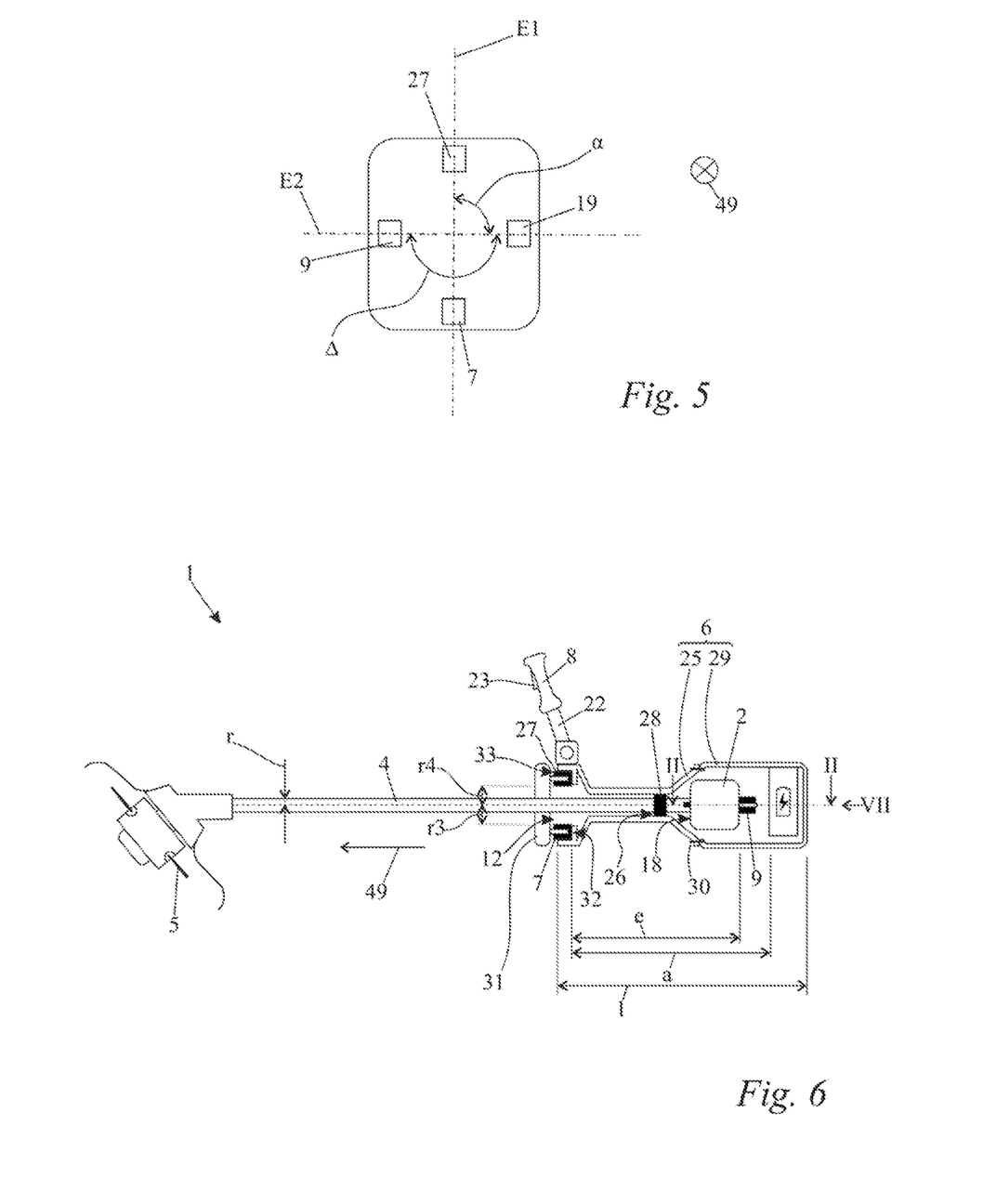
FIG. 5 shows a schematic illustration of the anti-vibration elements from FIG. 4, with the view directed in the direction of the arrow V from FIG. 4.
FIG. 6 shows a schematic sectional illustration of a third embodiment of a handheld work apparatus, having a first anti-vibration element and a second anti-vibration element; and, FIG. 7 shows a schematic illustration of the anti-vibration elements from FIG. 6, with the view directed in the direction of the arrow VII from FIG. 6.
Figure 7:
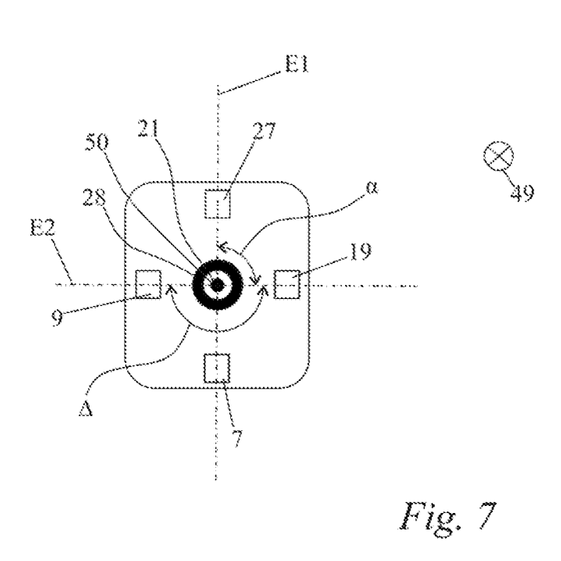

FIGS. 4 and 5 show a second embodiment for a handheld work apparatus 1. FIGS. 6 and 7 show a third embodiment for a handheld work apparatus 1. Reference signs of mutually equivalent components of the handheld work apparatuses 1 are the same in all embodiments. The description pertaining to the first embodiment according to FIGS. 1 to 3 largely applies to the second embodiment according to FIGS. 4 and 5 and to the third embodiment according to FIGS. 6 and 7. The second and the third embodiment differ substantially from the first embodiment in that the housing 6 according to the second and the third embodiment is configured such that a handle 8 is connected to the housing 6 in a vibration-coupled manner. To this end, the housing 6 in the second and in the third embodiment includes a holding part 25. The housing length l in the second and in the third embodiment is larger than in the first embodiment. The holding part 25 holds the handle 8 at least indirectly. The holding part 25 in terms of the longitudinal direction 49 completely overlaps the guide tube 4. The holding part 25 encompasses the guide tube 4. The holding part 25 encircles the circumference of the guide tube 4 so as to enclose the latter. In embodiments according to FIGS. 4 to 7, the entry point 12 for the guide tube 4 to the housing 6 is configured in the holding part 25. It can be provided that the holding part 25 is configured so as to be integral to the housing 6. In particular, the holding part 25 is configured so as to be materially integral to the housing 6. In the embodiment, the holding part 25 is fixedly connected to a base body 29 of the housing 6. A threaded connection 30 is in particular provided to this end.

The first anti-vibration element 7 is disposed on the entry point 12 also in the second and in the third embodiment. However, it can also be provided that the first anti-vibration element is disposed at a location other than the entry point 12. For example, the fifth anti-vibration element 28 from the third embodiment can also be considered to be the first anti-vibration element.

The first anti-vibration element 7 illustrated in FIGS. 4 and 6 in the second and in the third embodiment connects the housing 6 indirectly to the guide tube 4. A connecting piece 31 is disposed between the guide tube 4 and the first anti-vibration element 7. The connecting piece 31 is fastened, in particular rigidly fastened, to the guide tube 4.

The first anti-vibration element 7 in the second and in the third embodiment is disposed at a third radial spacing r3 from the transmission shaft 3, in particular from the output shaft 21 of the motor 2. The fourth anti-vibration element 27 is disposed at a fourth radial spacing r4 from the transmission shaft 3, in particular from the output shaft 21 of the motor 2. The third radial spacing r3 is at least the size of the radius r of the guide tube 4. The fourth radial spacing r4 is at least the size of the radius r of the guide tube 4.

The position of the second anti-vibration element 9 is unchanged. Accordingly, the element spacing e between the first anti-vibration element 7 and the second anti-vibration element 9 in the embodiments according to FIGS. 4 to 7 is larger than in the embodiment according to FIGS. 1 to 3. The battery spacing a between the first anti-vibration element 7 and the battery 20 in the embodiments according to FIGS. 4 to 7 is also larger than in the embodiment according to FIGS. 1 to 3. The ratios between the battery spacing a and the element spacing e, and the element spacing e and the housing length l, set forth in the context of the first embodiment however also apply to the second and the third embodiment.

In the second and in the third embodiment, the handle 8 is fastened to a guide 22. The guide 22 is rigidly connected to the housing 6. The guide 22 is rigidly connected to the holding part 25 of the housing 6. The actuating element 23 for activating the motor 2 is disposed on the handle 8. A second handle, not illustrated, is fastened to the guide 22. The handle 8 and the second handle are mutually spaced apart in the direction transverse, in particular perpendicular, to the longitudinal direction 49.

The handle 8, conjointly with the housing 6, is decoupled in terms of vibration in relation to the motor 2. The handle 8, conjointly with the housing 6, is decoupled in terms of vibration in relation to the guide tube 4. As a result, the user is exposed to less or no annoyance by the vibrations of the motor 2 and/or of the tool 5. Additional, in particular separate, anti-vibration elements which exclusively decouple the handle from the housing and/or exclusively decouple the battery from the housing, can be dispensed with. This results in a simpler and more inexpensive construction.

The handheld work apparatus 1 according to the second and according to the third embodiment has a fourth anti-vibration element 27 illustrated in FIGS. 5 and 7. The fourth anti-vibration element 27 is disposed such that the latter acts in a vibration-decoupling manner between the housing 6 and the guide tube 4. The fourth anti-vibration element 27 is disposed on that side 18 of the motor 2 that faces the tool 5. The fourth anti-vibration element 27 in terms of the longitudinal direction 49 is disposed between the motor 2 and the tool 5. The fourth anti-vibration element 27 mounts the housing 6 at a fourth bearing position 33 on the guide tube 4. The motor 2 is at least indirectly mounted at the fourth bearing position 33. The motor 2 on that side 18 of the motor 2 that faces the tool 5 is mounted indirectly at the third bearing position 32 as well as at the fourth bearing position 33.

As is illustrated in FIGS. 5 and 7, the handheld work apparatus 1 according to the second and the third embodiment has a third anti-vibration element 19. The description of the third anti-vibration element 19 pertaining to the first embodiment also applies to the second and the third embodiment. The third anti-vibration element 19 connects the motor 2 to the housing 6 in an at least indirectly vibration-decoupled manner. The third anti-vibration element 19 is disposed on that side 17 of the motor 2 that faces away from the tool 5.

The first anti-vibration element 7 and the fourth anti-vibration element 27 lie in a first plane E1, as is illustrated in FIGS. 5 and 7. The first plane E1 extends in the longitudinal direction 49. The second anti-vibration element 9 and the third anti-vibration element 19 lie in a second plane E2. The second plane E2 extends in the longitudinal direction 49. The first anti-vibration element 7 and the fourth anti-vibration element 27 are disposed so as to be co-level in terms of the longitudinal direction 49. The first anti-vibration element 7 and the fourth anti-vibration element 27 lie in a plane that runs perpendicularly to the longitudinal direction 49. The second anti-vibration element 9 and the third anti-vibration element 19 are disposed so as to be co-level in terms of the longitudinal direction 49. The second anti-vibration element 9 and the third anti-vibration element 19 lie in a common plane that runs perpendicularly to the longitudinal direction 49. The first plane E1 and the second plane E2 enclose an angle $\alpha$. The first plane E1 and the second plane E2 are tilted towards one another in terms of the longitudinal direction 49. The angle $\alpha$ is 70° to 110°. In the second and in the third embodiment, the angle $\alpha$ is from 80° to 100°.

The third embodiment according to FIGS. 6 and 7 differs from the second embodiment according to FIGS. 4 and 5 only in that a fifth anti-vibration element 28 is provided in the third embodiment. The fifth anti-vibration element 28 in terms of the longitudinal direction 49 is disposed between the first anti-vibration element 7 and the second anti-vibration element 9. The fifth anti-vibration element is disposed such that the latter acts in a vibration-decoupling manner between the housing 6 and the guide tube 4. The fifth anti-vibration element 28 is disposed on that side 18 of the motor 2 that faces the tool 5. The fifth anti-vibration element 28 encompasses the guide tube 4. The fifth anti-vibration element 28 completely encircles the guide tube 4. The handheld work apparatus 1 according to the third embodiment has a gap 26 between the guide tube 4 and the housing 6. The gap 26 in terms of the longitudinal direction 49 is disposed between the motor 2 and the entry point 12. The fifth anti-vibration element 28 seals the gap 26. As a result, that part of the housing 6 in which the motor 2 is disposed is sealed on that side 18 of the motor 2 that faces the tool 5. As a result, a positive cooling air management for cooling the motor 2 is possible. The fifth anti-vibration element 28 acts in the direction transverse, in particular in the direction perpendicular, to the longitudinal direction 49. The fifth anti-vibration element 28 connects the guide tube 4 directly to the housing 6. However, it can also be provided that at least one component which is fixedly connected to the guide tube 4 is disposed between the fifth anti-vibration element 28 and the guide tube 4 such that the at least one component vibrates conjointly with the guide tube 4. In this case, the fifth anti-vibration element 28 by way of the at least one component is connected indirectly to the guide tube 4. It can also be provided that at least one construction element which is fixedly connected to the housing 6 is disposed between the housing 6 and the fifth anti-vibration element 28 such that the at least one construction element vibrates conjointly with the guide tube 4. In this case, the fifth anti-vibration element 28 by way of the at least one construction element is connected indirectly to the guide tube 4.

The description of FIG. 5 also applies to FIG. 7. The fifth anti-vibration element 28 is also additionally illustrated in FIG. 7.

The schematic FIG. 2 shows not only a section along the section line II-II from FIG. 1 but also a section along the section line II-II from FIG. 6. The description pertaining to FIG. 2 also applies to the third embodiment, wherein the anti-vibration element which in the description is referred to as the first anti-vibration element 7 corresponds to the fifth anti-vibration element 28. The section line II-II is also plotted in FIG. 4. However, the sectional illustration in FIG. 2 additionally shows the first anti-vibration element 7 of the first embodiment, which in the second embodiment is disposed at another location. With the exception of the description pertaining to the first anti-vibration element 7, the description of FIG. 2 also applies to the second embodiment.

It is understood that the foregoing description is that of the preferred embodiments of the invention and that various changes and modifications may be made thereto without departing from the spirit and scope of the invention as defined in the appended claims.

The invention claimed is:

1. A handheld work apparatus comprising:
a motor;
a battery for supplying the motor with energy;
a transmission shaft;
a tool;
a guide tube having a front longitudinal end and a rear longitudinal end;
a housing;
a first anti-vibration element;
said motor being configured to drive said tool via said transmission shaft;
said transmission shaft being received in said guide tube;
said motor being disposed in said housing;
said tool being disposed on said front longitudinal end of said guide tube;
said housing being disposed on said rear longitudinal end of said guide tube;
said housing at least partially encompassing the guide tube;
said guide tube projecting from said housing;
said guide tube at an entry point extending into said housing in a longitudinal direction;
said first anti-vibration element being disposed such that said first anti-vibration element acts in a vibration-decoupling manner between said housing and said guide tube;
said first anti-vibration element being disposed on a side of said motor facing said tool;
a second anti-vibration element connecting said motor to said housing in an at least indirectly vibration-decoupled manner;
said battery being connected to the housing in such a manner that the battery, conjointly with the housing, via said second anti-vibration element is vibration-decoupled from the motor; and,
wherein said second anti-vibration element is disposed at an element spacing, measured in the longitudinal direction, from said first anti-vibration element; said first anti-vibration element in relation to the battery has a battery spacing measured in the longitudinal direction; and, said element spacing is at least 50% of said battery spacing.

2. The handheld work apparatus of claim 1, wherein said housing has a housing length, measured in the longitudinal direction; and, said element spacing is at least 30% of said housing length.

3. The handheld work apparatus of claim 2, wherein said element spacing is at least 40% of said housing length.

4. The handheld work apparatus of claim 1, wherein said second anti-vibration element connects said guide tube to said housing in an at least indirectly vibration-decoupled manner.

5. The handheld work apparatus of claim 1, wherein said second anti-vibration element is disposed on a side of said motor that faces away from said tool.

6. The handheld work apparatus of claim 1, wherein said battery spacing is at least 100 millimeters.

7. The handheld work apparatus of claim 1, wherein said battery spacing is at least 500 millimeters.

8. The handheld work apparatus of claim 1, wherein said battery spacing is at least 800 millimeters.

9. The handheld work apparatus of claim 1, wherein said battery spacing is larger than said element spacing.

10. The handheld work apparatus of claim 1, wherein said battery is disposed on a side of said motor that faces away from said tool.

11. The handheld work apparatus of claim 1, wherein at least one of: said guide tube is at least indirectly rigidly connected to the motor; and, said guide tube and the motor are connected via a connection which is free of any anti-vibration element.

12. The handheld work apparatus of claim 1, wherein said motor has an output shaft; said guide tube defines a radius; said motor on a side facing away from said tool at least at a first bearing position and a second bearing position is connected in a vibration-decoupled manner to said housing; said first bearing position is disposed at a first radial spacing from said output shaft of said motor; said second bearing position is disposed at a second radial spacing from said output shaft; said first radial spacing and said second radial spacing are each at least as great as said radius of said guide tube; and, said first bearing position and said second bearing position are mutually disposed at an angular spacing relative to said output shaft of said motor.

13. The handheld work apparatus of claim 1 further comprising a third anti-vibration element; said third anti-vibration element connecting said motor to said housing in an at least indirectly vibration-decoupled manner; said third anti-vibration element being disposed on a side of said motor that faces away from said tool; a fourth anti-vibration element disposed such that said fourth anti-vibration element acts in a vibration-decoupling manner between said housing and said guide tube; said first anti-vibration element and said fourth anti-vibration element lying in a first plane extending in the longitudinal direction; said second anti-vibration element and said third anti-vibration element lying in a second plane extending in the longitudinal direction; and, said first plane and said second plane enclosing an angle α of 70° to 110°.

14. The handheld work apparatus of claim 13, wherein said angle α is 80° to 100°.

15. The handheld work apparatus of claim 1, wherein said handheld work apparatus is configured such that a transmission of vibrations from said transmission shaft to said housing is possible only so as to be damped by way of anti-vibration elements.

16. The handheld work apparatus of claim 1 further comprising a handle connected to said housing; and, said handle conjointly with said housing being vibration-decoupled from said guide tube as well as from said motor.

17. The handheld work apparatus of claim 1, wherein said motor is connected to said housing exclusively by intervening anti-vibration elements including said first anti-vibration element and said second anti-vibration element such that vibrations are able to be transmitted from said motor to said housing only so as to be damped by way of anti-vibration elements.

* * * * *

UNITED STATES PATENT AND TRADEMARK OFFICE
CERTIFICATE OF CORRECTION

PATENT NO. : 12,233,524 B2
APPLICATION NO. : 18/307589
DATED : February 25, 2025
INVENTOR(S) : J. Menzel et al.

Page 1 of 1

It is certified that error appears in the above-identified patent and that said Letters Patent is hereby corrected as shown below:

In the Specification

In Column 10:
Line 31: Delete:
"As illustrated in FIG. 3, the first bearing position 13 and the second bearing position 14 are disposed at an angular spacing a from each other. The angular spacing a is measured in relation to the rotational axis 50 of the output shaft 21 of the motor 2. The angular spacing a is at least 90°, in particular at least 150°. In the embodiment, the angular spacing a is at least 170°. The angular spacing a is at most 270°, in particular at most 210°. In the embodiment, the angular spacing a is 190°."

And insert:
-- As illustrated in FIG. 3, the first bearing position 13 and the second bearing position 14 are disposed at an angular spacing $\alpha$ from each other. The angular spacing $\alpha$ is measured in relation to the rotational axis 50 of the output shaft 21 of the motor 2. The angular spacing $\alpha$ is at least 90°, in particular at least 150°. In the embodiment, the angular spacing $\alpha$ is at least 170°. The angular spacing $\alpha$ is at most 270°, in particular at most 210°. In the embodiment, the angular spacing $\alpha$ is 190°. --

Signed and Sealed this
Tenth Day of June, 2025

Coke Morgan Stewart
*Acting Director of the United States Patent and Trademark Office*